United States Patent [19]

Neufeld

[11] 4,332,358

[45] Jun. 1, 1982

[54] SPIN CASTING TYPE FISHING REEL WITH IMPROVED DUAL CRANK BEARING RETENTION MEANS

[75] Inventor: Henry L. Neufeld, Tulsa, Okla.

[73] Assignee: Brunswick Corporation, Skokie, Ill.

[21] Appl. No.: 218,925

[22] Filed: Dec. 22, 1980

[51] Int. Cl.³ .............................................. A01K 89/01
[52] U.S. Cl. ............................ 242/84.2 A; 242/84.1 J
[58] Field of Search ...................... 242/84.1 J, 84.2 R, 242/84.2 A, 84.21 R, 84.21 A, 84.1 R, 84.51 A, 84.5 A

[56] References Cited

U.S. PATENT DOCUMENTS

| | | | |
|---|---|---|---|
| 3,381,914 | 5/1968 | Taggart | 242/84.21 A |
| 3,836,092 | 9/1974 | Hull | 242/84.2 A |
| 3,946,963 | 3/1976 | Oberg | 242/84.51 A X |
| 4,077,587 | 3/1978 | Ueda | 242/84.21 R |
| 4,156,510 | 5/1979 | Hull | 242/84.2 A |

*Primary Examiner*—Billy S. Taylor
*Attorney, Agent, or Firm*—John G. Heimovics

[57] ABSTRACT

A spin casting fishing reel (10) has a cylindrical body (20) with a transverse deck plate (21) and circumferential forward (22) and rearward (23) body portions with integral axially aligned hollow bosses (39 and 40) at opposite sides of the rearward reel body portion. There is a crank bearing sleeve (160 and 161) slidably mounted in each of the hollow bosses (39 and 40), and a gear crank assembly (310) is journalled in the crank bearing sleeves (160 and 161). A back housing (11) for the reel has a cylindrical cover (12) mating with the periphery of the rearward circumferential body portion (23) and is detachably secured to the body. Transversely extending interengaging parts (45, 46 and 164) on each of the hollow bosses (39 and 40) and on each crank bearing sleeve (160 and 161) fix the rotational orientation of the bearing sleeves in the bosses, and abutting surfaces (46, 47 and 165) limit inward movement of the sleeves in the bosses. An inwardly facing surface (51 or 52) on a rearward part of each hollow boss (39 or 40) and an outwardly facing surface (167) on a rearward part of each sleeve (160 and 161) form the outer and inner sides, respectively, of a rearwardly open recess, and a forwardly projecting web (19) at each side of the back housing (11) extends into one of the aforesaid rearwardly open recesses to restrict lateral outward movement of the crank bearing sleeves (160 and 161).

5 Claims, 7 Drawing Figures

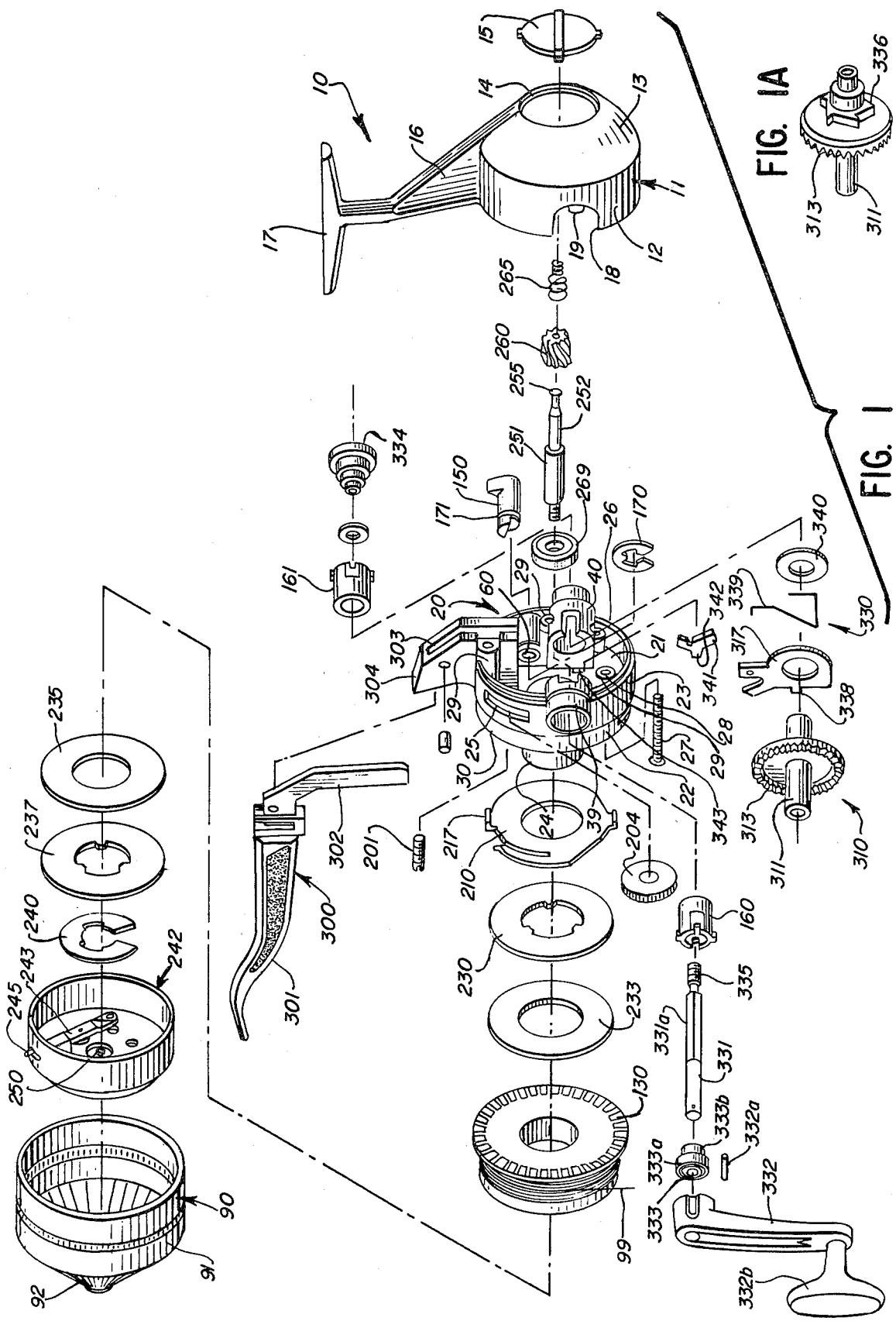

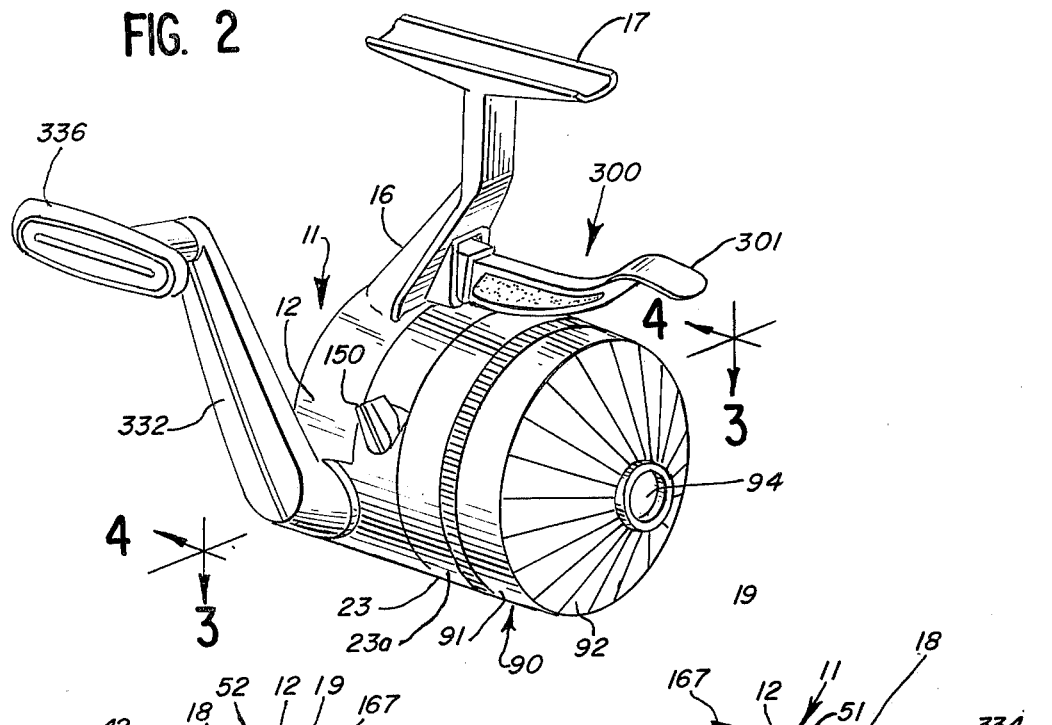
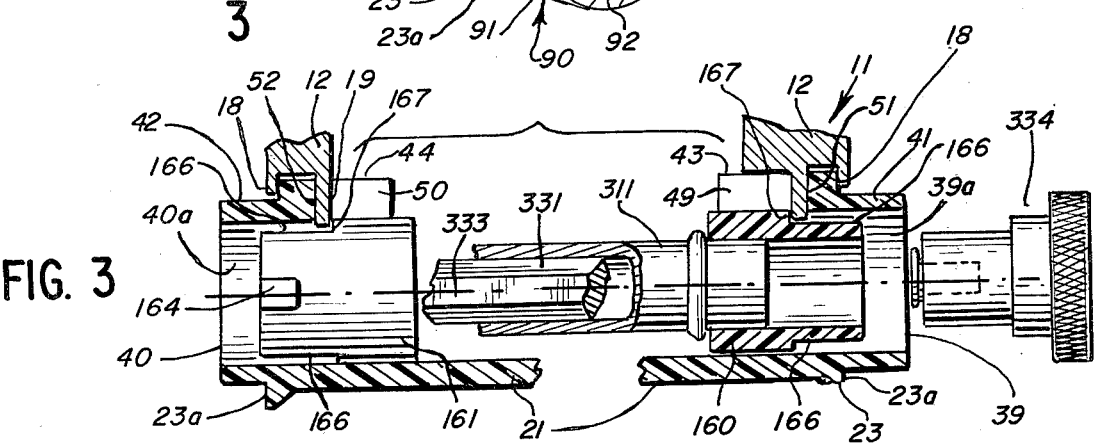
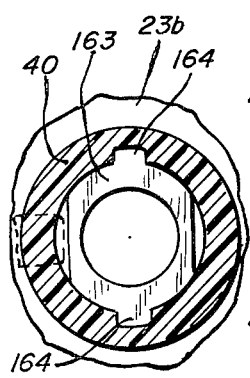
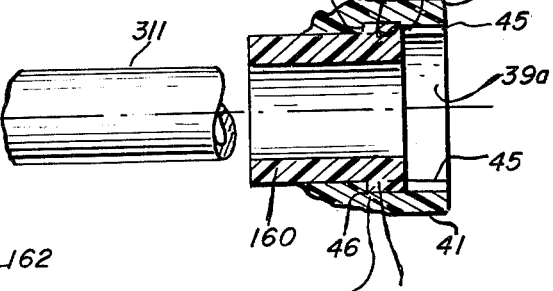
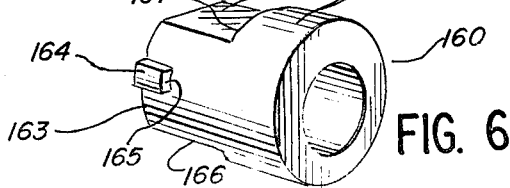

SPIN CASTING TYPE FISHING REEL WITH IMPROVED DUAL CRANK BEARING RETENTION MEANS

TECHNICAL FIELD

This invention relates to an improvement in spin casting style fishing reels, and in particular it relates to an improved structure for retaining dual bearing sleeves in hollow bearing mounting bosses.

BACKGROUND ART

Spin casting style fishing reels commonly have a molded plastic body having axially aligned hollow bosses at its two sides to receive bearing sleeves for the crankshaft by means of which the line pickup mechanism is operated for retrieving line. For ease of assembly, it is desirable that the bearing sleeves slide into the mounting bosses from the outside, and this, then, requires that when the reel is assembled there be some means for retaining the bearing sleeves in the bosses.

It has heretofore been known to provide some means for clamping the bearing sleeves, but this can result in sleeve distortion that interferes with free rotation of the gear crankshaft.

SUMMARY OF THE INVENTION

A spin casting fishing reel is of the type which has a cylindrical reel body with a transverse deck plate and circumferential forward and rearward body portions which extend, respectively, fore and aft of the deck plate and have external and internal surfaces. A pair of integral, hollow bosses at opposite sides of the rearward reel body portion are axially aligned with one another and have respective outer projections extending outwardly of the external surface and respective inner projections extending inwardly of the internal surface. A crank bearing sleeve means is axially slidably mounted in each of the bosses, and gear crank assembly means is journalled in the crank bearing sleeve means. A back housing for the reel includes a cylindrical cover mating with the periphery of the rearward circumferential body portion, and means detachably secure the back housing to the cylindrical body.

The hollow bosses and the crank bearing sleeve means are provided with transversely extending interengaging means which fix the rotational orientation of the bearing sleeve means in the bosses, and abutting surfaces on the bosses and on the sleeve means limit inward movement of the sleeve means in the bosses. Additionally, an inwardly facing surface on a rearward part of each hollow boss and an outwardly facing surface on a rearward part of each sleeve means form the outer and inner sides, respectively, of a rearwardly open recess; and forwardly projecting means at the two sides of the back housing extend into both of the aforesaid recesses to restrict lateral outward movement of both crank bearing sleeve means.

BRIEF DESCRIPTION OF DRAWINGS

FIG. 1 is an exploded perspective view of the spin casting style fishing reel containing the invention described herein;

FIG. 1A is another perspective view of the crankshaft and gear;

FIG. 2 is a perspective view of a fishing reel containing the invention, with the crank handle in a position reversed from that of FIG. 1;

FIG. 3 is a fragmentary sectional view on an enlarged scale, taken substantially as indicated along the line 3—3 of FIG. 2, illustrating the bearing retention means of the invention;

FIG. 4 is a fragmentary sectional view on an enlarged scale, taken substantially as indicated along the line 4—4 of FIG. 3, illustrating the bearing retention means of the invention;

FIG. 5 is a fragmentary sectional view taken substantially as indicated along the line 5—5 of FIG. 4; and FIG. 6 is a perspective view on an enlarged scale of the crank bearing of the invention.

BEST MODE FOR CARRYING OUT THE INVENTION

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semispherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plate 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through apertures 28 in bosses 29 formed through and on the deck plate 21 and into mating bosses (not shown) in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw projects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242 is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330 which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an anti-reverse assembly 330, which comprises a ratchet 336, mounted on the crankshaft 311 against the back side of face gear 313 as shown in FIG. 1A, an anti-reverse drag arm 337 having a transverse lug 338, a drag spring 339 and spacer washer 340 all mounted on the hollow crankshaft 311. An anti-reverse pawl 341, having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet 336.

Anti-reverse actuator 150 is mounted in upper housing sleeve 60 that opens through the wall of the rearward body portion 23 of body 20, and the actuator 150 is retained in the sleeve 60 by retainer clip 170 seated in slot 171 in the body of the anti-reverse actuator 150. The anti-reverse actuator 150 is in cooperative contact, as will be described hereinafter, with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward from the stem 16 toward the back of the reel 10). In the other position of the actuator 150, the crank assembly can rotate to wind the line 99 on the spool 130.

Referring now particularly to FIGS. 3 to 6, the bosses 39 and 40 on the body portion 23 of the reel are seen to have respective outer projections 41 and 42 which extend outwardly of an external surface 23a of the body portion, and respective inner projections 43 and 44 which extend inwardly of an internal surface 23b of said body portion. At the top and bottom of the boss 39 are blind grooves 45 which extend axially inwardly from the outer extremity of the outward projection 41 of the boss, and which have radially extending inner ends 46. Similarly, the boss 40 has blind grooves 47 with radially extending inner ends 48. The respective inner projections 43 and 44 of the bosses 39 and 40 have respective through slots 49 and 50 which extend outwardly from the inner extremities of the bosses and terminate in respective inwardly facing radial surfaces 51 and 52. The hollow bosses 39 and 40 have respective inner surfaces 39a and 40a which are cylindrical.

The crank bearing sleeve means 160 and 161 are identical, so only the sleeve means 160 illustrated in FIG. 6 will be described in detail. Each of the sleeve means has a cylindrical outer surface 162 which makes an easy sliding fit in the cylindrical internal surface of one of the hollow bosses 39 or 40, and extending inwardly from an outer end 163 of each of the bearing sleeve means are lugs 164 which slide into the respective top and bottom groove 45 or 47 as the case may be. Thus, the grooves 45 and 47, in combination with the lugs 164, provide transversely extending interengaging means which fix the rotational orientation of the bearing sleeve means 160 and 161 in the bosses 39 and 40. An inner end 165 of each of the bosses 164 bears against a radially extending inner end 46 or 48, as the case may be, of a groove 45 or 47, so that 165 and 46 or 48 provide abutting surfaces which limit inward movement of the sleeve means 160 and 161 in the bosses 39 and 40.

The cylindrical outer surface 162 of the bearing sleeve means is provided on opposite surfaces with flat areas 166 which have radially extending inner extremities 167, and one of said flat areas faces toward the rear of the reel body when a bearing sleeve is mounted in a boss with the lugs 164 in the blind grooves 45 or 46, as the case may be. As seen in FIG. 3, the inwardly facing surfaces 51 or 52 of the respective bosses 39 or 40 and the outwardly facing inner extremities 167 of the flat areas 166 form the outer and inner sides, respectively, of a rearwardly open recess.

Referring again to FIG. 1, the cylindrical cover 12 of the back support housing 11 has semicircular marginal cutouts 18 at its two sides, only one of which is shown in the drawing, which accommodate the rear halves of the bosses 39 and 40. Spaced inwardly from the cover 12 are integral, upright webs 19 which provide forwardly projecting means at each side of the back housing 11, and as seen in FIG. 3, each of the webs 19 extends into one of the rearwardly open recesses last described. Thus, when the back support housing 11 is secured to the reel body 20, the webs 19 restrict lateral outward movement of the crank bearing sleeve means.

When the back support housing 11 is secured to the body 20 by means of the screws 27, the screws draw the housing and the body into firm abutment, and the length of the integral webs 19 is such that they are clear of the flat areas 166 of the bearing sleeves 160 and 161. Thus, the assembly of the reel parts places no pressure on the bearing sleeves, and in addition the cutouts 18 in the forward margin of the cylindrical cover 12 are clear of the bosses 39 and 40 to avoid any possibility of distorting the bosses and thus putting undesirable pressure on the bearing sleeves. The present assembly, therefore, eliminates a problem which has heretofore existed in certain spin-type fishing reels.

The foregoing detailed description has been given for clearness of understanding only and no unnecessary limitations should be understood therefrom as modifications will be obvious to those skilled in the art.

I claim:

1. In a spin casting style fishing reel (10) of the type which has a cylindrical reel body (20) with a transverse deck plate (21) and circumferential forward (22) and rearward (23) body portions which extend, respectively, fore and aft of said deck plate (21) and have external (23a) and internal (23b) surfaces, a pair of integral, hollow bosses (39 and 40) at opposite sides of the rearward reel body portion (23), said bosses being axially aligned with one another and having respective outer projections (41 and 42) extending outwardly of said external surface (23a) and respective inner projections (43 and 44) extending inwardly of said internal surface (23b), a crank bearing sleeve means (160 and 161) in each of said hollow bosses (39 and 40), each of said sleeve means being axially slidably mounted in a boss, gear crank assembly means (310) journalled in the crank bearing sleeve means (160 and 161), a back housing (11) for said reel which has a cylindrical cover (12) mating with the periphery of the rearward circumferential body portion (23), and means (27) detachably securing said back housing (11) to said cylindrical body (20), the improvement comprising, in combination:

transversely extending interengaging means (45, 46 and 164) on each of said hollow bosses (39 and 40) and crank bearing sleeve means (160 and 161) which fix the rotational orientation of the bearing sleeve means (160 and 161) in the bosses, and abutting surfaces (46, 47 and 165) on said bosses and said sleeve means which limit inward movement of said sleeve means in said bosses;

an inwardly facing surface (51 or 52) on a rearward part of each hollow boss (39 or 40) and an outwardly facing surface (167) on a rearward part of each sleeve means (160 or 161), each of said inwardly (51 or 52) and outwardly (167) facing surfaces forming the outer and inner sides, respectively, of a rearwardly open recess;

and a forwardly projecting means (19) at each side of the back housing (11), each said forwardly projecting means (19) extending into one of said recesses to restrict lateral outward movement of one of the crank bearing sleeve means (160 or 161).

2. The improvement of claim 1 in which the transversely extending interengaging means in each hollow boss (39 or 40) comprises an internal blind groove (45 or 46) extending axially inwardly from the outer extremity of the outward projection (41 or 42) of said boss and a lug (164) on the sleeve means which makes a sliding fit in said internal blind groove (45 or 46) and in which the abutting surfaces (46, 47 and 165) comprise a radially extending shoulder (46 or 47) defining the inner end of the blind groove (45 or 46) and a radially extending inner end (165) of said lug (164).

3. The improvement of claim 1 or claim 2 in which the inwardly facing surface (51 or 52) on a rearward part of each hollow boss (39 or 40) comprises the outer extremity of a through slot (49 or 50) formed in the inner projection (43 or 44) of said hollow boss (39 or 40), the inner surface (39a or 40a) of the hollow boss and the outer surface (162) of the sleeve means (160 or 161) are cylindrical, and the outwardly facing surface (167) on a rearward part of each sleeve means (160 or 161) comprises the inner extremity of a flat area (166) on the cylindrical outer surface of the boss.

4. The improvement of claim 1 or claim 2 in which the forwardly projecting means (19) at each side of the back housing (11) comprises an integral web thereon.

5. The improvement of claim 3 in which the forwardly projecting means (19) at each side of the back housing (11) comprises an integral web thereon.

* * * * *